(12) United States Patent
Ye et al.

(10) Patent No.: US 12,223,624 B2
(45) Date of Patent: Feb. 11, 2025

(54) IMAGE DISPLAY METHOD AND APPARATUS, AND DEVICE AND MEDIUM (71) Applicant: BEIJING ZITIAO NETWORK TECHNOLOGY CO., LTD., Beijing (CN)

(72) Inventors: Xinjing Ye, Beijing (CN); Junsheng Wu, Beijing (CN); Yahan Liang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/366,939

(22) Filed: Aug. 8, 2023

(65) Prior Publication Data
US 2023/0386001 A1 Nov. 30, 2023

Related U.S. Application Data (63) Continuation of application No. PCT/CN2022/074918, filed on Jan. 29, 2022.

(30) Foreign Application Priority Data

Feb. 9, 2021 (CN) .......................... 202110178213.3

(51) Int. Cl.
G06T 5/50 (2006.01)
(52) U.S. Cl.
CPC ...... *G06T 5/50* (2013.01); *G06T 2207/20221* (2013.01)

(58) Field of Classification Search
CPC .................. G06T 5/50; G06T 2207/20221
See application file for complete search history.

(56) References Cited

U.S. PATENT DOCUMENTS

2010/0245382 A1  9/2010  Sio
2012/0288190 A1*  11/2012  Tang .................. G06F 16/5846
382/199

(Continued)

FOREIGN PATENT DOCUMENTS

CN  106651766 A  *  5/2017 ........... G06T 3/0012
CN  106920212 A   7/2017

(Continued)

OTHER PUBLICATIONS

The extended European search report issued in European Application No. 22752185.3, dated Oct. 30, 2023.

(Continued)

*Primary Examiner* — Mekonen T Bekele
(74) *Attorney, Agent, or Firm* — Astute IP Law Group (57) ABSTRACT An image display method and apparatus, and a device and a medium are provided. The image display method includes: acquiring a plurality of original images, wherein the original images are images comprising original objects; respectively performing style migration processing on the original objects in the plurality of original images, so as to obtain a plurality of stylized images of the plurality of original images that correspond to a target style; and displaying a synthesized image, where the synthesized image is an image obtained by synthesizing the plurality of stylized images and a background image corresponding to the target style.

18 Claims, 5 Drawing Sheets (56) References Cited

U.S. PATENT DOCUMENTS

| | | |
|---|---|---|
| 2017/0148222 A1 | 5/2017 | Holzer et al. |
| 2018/0082715 A1 | 3/2018 | Rymkowski et al. |
| 2022/0284638 A1 | 9/2022 | Zhu |

FOREIGN PATENT DOCUMENTS

| | | | | |
|---|---|---|---|---|
| CN | 109618222 A | | 4/2019 | |
| CN | 110689478 A | * | 1/2020 | ........... G06T 3/0012 |
| CN | 110956654 A | | 4/2020 | |
| CN | 111931566 A | | 11/2020 | |
| CN | 111986076 A | * | 11/2020 | ........... G06K 9/6215 |
| CN | 113012082 A | | 6/2021 | |
| EP | 795250 A1 | * | 9/1997 | ......... H04N 21/4131 |
| KR | 20060071697 A | * | 11/2006 | |

OTHER PUBLICATIONS

M. Yang, S. Lin, p. Luo, L. Lin and H. Chao, "Semantics-driven portrait cartoon stylization," 2010 17th IEEE International Conference On Image Processing (ICIP 2010); Sep. 26-29, 2010; Hong Kong, China, IEEE, Piscataway, NJ, USA, Sep. 26, 2010, pp. 1805-1808, XP031813230.

Y. Zhang et al., "Data-Driven Synthesis of Cartoon Faces Using Different Styles," Proceedings of the the International Conference On Engineering & MIS 2015, ICEMIS '15, ACM Press, New York, New York, USA, Nov. 24, 2014, pp. 1-4, XP059169990.

* cited by examiner

IMAGE DISPLAY METHOD AND APPARATUS, AND DEVICE AND MEDIUM

This application is a continuation of International Application No. PCT/CN2022/074918, filed on Jan. 29, 2022 which claims priority to Chinese Patent Application No. 202110178213.3, titled "IMAGE DISPLAY METHOD AND APPARATUS, AND DEVICE AND MEDIUM", filed on Feb. 9, 2021 with the China National Intellectual Property Administration, both of which are incorporated herein by reference in their entireties.

FIELD

The present disclosure relates to the field of multimedia technology, and in particular to a method, an apparatus, and a device for displaying an image, and a medium.

BACKGROUND

With the rapid development of computer technology and mobile communication technology, various image beautification platforms based on an electronic device are widely applied, significantly enriching the daily life of users. More users are intended to beautify an image on an image beautification platform, such as adding a filter effect or stitching images.

In an image stitching process, a user needs to first perform some complex image beautification operations, such as face beautification and background beautification, on the images; and then perform image editing operations, such as image clipping and image stitching, on the beautified images, so as to finally generate a composite image. If the user is not good at image beautification or image editing, a time cost for producing the composite image is increased, a quality of the composite image cannot be guaranteed, and user experience is degraded.

SUMMARY

In order to solve or at least partially solve the above technical problem, a method, an apparatus, and a device for displaying an image, and a medium are provided in the present disclosure.

In a first aspect, a method for displaying an image is provided according to the present disclosure. The method includes: obtaining multiple original images, where each of the original images includes an original object; performing a style transfer operation on the original object in the original images, to obtain multiple stylized images corresponding to the original images in a target style; and displaying a composite image obtained by compositing the stylized images and a background image corresponding to the target style.

In a second aspect, an apparatus for displaying an image is provided according to the present disclosure. The apparatus includes: an image obtaining unit configured to obtain multiple original images, where each of the original images includes an original object; a first processing unit configured to perform a style transfer operation on the original object in the original images, to obtain multiple stylized images corresponding to the original images in a target style; and a first display unit configured to display a composite image obtained by compositing the stylized images and a background image corresponding to the target style.

In a third aspect, a device for displaying an image is provided according to the present disclosure. The device includes: a process; and a memory storing executable instructions. The processor is configured to read the executable instructions from the memory, and execute the executable instructions to implement the method for displaying the image as described in the first aspect.

In a fourth aspect, a computer-readable storage medium is provided according to the present disclosure. The computer-readable storage medium stores a computer program. The computer program, when executed by a processor, causes the processor to implement the method for displaying the image as described in the first aspect.

Compared to a conventional technology, the technical solutions provided in embodiments of the present disclosure has the below advantages.

With the method, the apparatus, and the device for displaying the image, and the medium according to the embodiments of the present disclosure, multiple original images are obtained. Each of the original images includes an original object. The style transfer operation is performed on the original object in the original images to obtain multiple stylized images corresponding to the original images in a target style. A composite image obtained by compositing the stylized images and a background image corresponding to the target style is displayed. Then, the original images are beautified and stitched in the target style automatically, without a manual operation from a user, such as an image beautification operation or an image editing operation. In this way, the composite image in the target style is generated automatically by using the original images. Therefore, the time cost for producing the composite image is reduced, the quality of the composite image is improved, and the user experience is improved.

BRIEF DESCRIPTION OF THE DRAWINGS

The above and other features, advantages, and aspects of embodiment of the present disclosure become more apparent with reference to the accompanying drawings and the following specific embodiments. Throughout the accompanying drawings, identical or similar reference numerals represent identical or similar elements. It should be understood that the drawings are illustrative, and components and elements are unnecessarily drawn to scale.

DETAILED DESCRIPTION

Embodiments according to the present disclosure are described in further detail below with reference to the drawings. Although some embodiments according to the present disclosure are shown in the drawings, it should be understood that the present disclosure may be implemented in various forms and should not be construed as being limited to the embodiments set forth herein. Instead, these embodiments are provided for a thorough and complete understanding of the present disclosure. It should be understood that the drawings and embodiments according to the present disclosure are only for illustration rather than intended to limit the protection scope of the present disclosure.

It should be understood that the steps described in the method embodiments according to the present disclosure may be performed in a different order and/or performed in parallel. Furthermore, method embodiments may include additional steps and/or eliminate an illustrated step. The scope according to the present disclosure is not limited in this regard.

The term "includes" and variants thereof used herein are inclusive, i.e., means "includes but is not limited to". The term "based on" refers to "based at least in part on". The term "an embodiment" refers to "at least one embodiment." The term "another embodiment" refers to "at least one another embodiment". The term "some embodiments" refers to "at least some embodiments". Relevant definitions of other terms are given in the description below.

It should be noted that concepts such as "first" and "second" are used herein merely for distinguishing different apparatuses, modules or units from each other, and are not intended to define an order or interdependence of functions performed by these apparatuses, modules or units.

It should be noted that the modifiers such as "one" and "multiple" herein are illustrative rather than restrictive. Those skilled in the art should understand that, unless otherwise explicitly pointed out in the context, these terms should be understood as "one or more".

The names of messages or information transmitted between multiple devices in the embodiment of the present disclosure are only used for illustrative purposes, and are not intended to limit a scope of these messages or information.

According to embodiments of the present disclosure, a method, an apparatus, and a device for displaying an image, and a medium are provided, which is capable of beautifying and stitching an image automatically.

Hereinafter a method for displaying an image according to an embodiment of the present disclosure is illustrated with reference to FIG. 1.

In an embodiment of the present disclosure, the method for displaying the image may be executed by an electronic device. The electronic device may include a device having a communication function, such as, a mobile phone, a tablet, a desktop computer, a laptop, an in-vehicle terminal, a wearable electronic device, an all-in-one machine, a smart home device; or may be a device simulated by a virtual machine or simulator.

Figure 1:
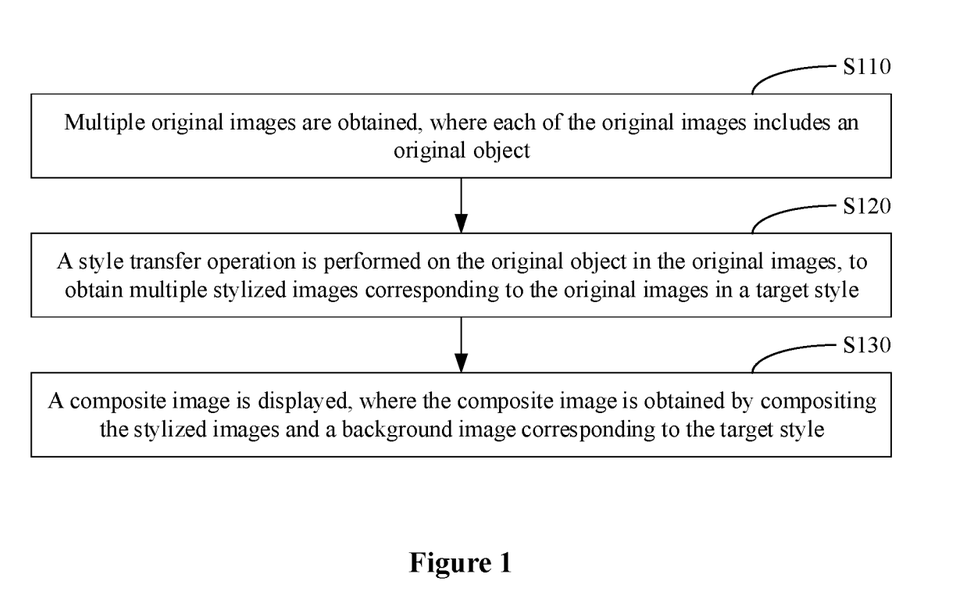
FIG. 1 is a flowchart of a method for displaying an image according to an embodiment of the present disclosure.

FIG. 1 shows a flowchart of a method for displaying an image according an embodiment of the present disclosure.

As shown in FIG. 1, the method may include the following steps S110 to S130.

In S110, multiple original images are obtained, where each of the original images includes an original object.

In an embodiment of the present disclosure, multiple original images each including an original object may be obtained by using an electronic device when a user wants to beautify and stitch the original object.

In an embodiment, the original object may be preset based on an actual need, which is not limited here.

In an embodiment, the original object may include at least one of a person, an animal, or a substance.

In another embodiment, the original object may include a designated part, such as a designated body part of a person or animal.

For example, the original object may include heads of all people or animals.

In an embodiment of the present disclosure, the original image may be captured in real time by a user using an electronic device.

In an example, the user may control the electronic device to enter an image capture mode, and continuously capture multiple original images through a shooting method specified under the image capture mode while the electronic device is in the image capture mode.

For example, the original object may be a head of the user. In this case, the user may trigger the electronic device to capture an original image by blinking while the electronic device is in the image capture mode. Thereby, an original image including the head of the user can be captured every time the electronic device detects a blinking action of the user.

In another embodiment, the original image may be selected by the user from local images stored on the electronic device.

In an example, the user may control the electronic device to enter an image selection mode, and select multiple original images from local images displayed in the electronic device while the electronic device is in the image selection mode.

It should be noted that an algorithm resource, such as an expression detection algorithm, a posture detection algorithm and an object modification algorithm, may be loaded in a real-time capturing process of the electronic device. Therefore, the electronic device may trigger a capturing operation in response to a designated posture or expression. Additionally, preliminary modifications such as makeup and filtering may be applied to the original object in the captured original image. Since the algorithms needs more resources, resources for the algorithms may be released in a process of selecting the original image from the local images stored on the electronic device, so as to reduce resource utilization of the electronic device.

In an embodiment of the present disclosure, the quantity of the original images may be preset based on an actual need, and is not limited here. For example, the quantity of the original images may be 3, 5, or the like.

In an embodiment of the present disclosure, one original image may include one original object, or one original image may include multiple original objects, which is not limited herein.

For example, the original object may be a head of a user. One original object may include a head of one user, or one original object may include heads of multiple users, which is not limited herein.

In S120, a style transfer operation is performed on the original object in the original images, to obtain multiple stylized images corresponding to the original images in a target style.

In an embodiment of the present disclosure, after obtaining the multiple original images, the electronic device may perform the style transfer operation on the original object in the original images based on a preset stylization process, and obtain stylized images corresponding to the original images in the target style, respectively. The stylized images are obtained by beautifying the original images. The preset stylization process may be a style transfer operation towards the target style.

The target style may be preset based on an actual need, which will not be limited here. For example, the target style may be a comic style.

In an embodiment of the present disclosure, the original image includes a single original object. In this case, the electronic device may perform the style transfer operation directly on the original object in the original images to obtain the stylized images.

In another embodiment of the present disclosure, the original image includes multiple original objects. In this case, the S120 may further include: performing, for each of the original images, the style transfer operation on an original object with the largest size in the original image, to obtain the stylized image.

In an example, for each of the original images, the electronic device may perform the style transfer operation merely on the original object with the largest size in the original image, so as to obtain the stylized image corresponding to the original image. Thereby, a stylized image corresponding to a dominant original object can be generated based on the original image.

In an embodiment of the present disclosure, the original image includes multiple original objects. In this case, the S120 may further include: performing, for each of the original images, the style transfer operation on all original objects in the original image, to obtain a stylized image corresponding to all original objects in the original images.

In an example, for each of the original images, the electronic device may perform the style transfer operation on all original objects in the original image, so as to obtain the stylized image corresponding to the original objects in the original image.

In S130, a composite image is displayed, where the composite image is obtained by compositing the stylized images and a background image corresponding to the target style.

In an embodiment of the present disclosure, the electronic device may obtain a background image corresponding to the target style after obtaining the stylized images, and display a composite image obtained by compositing the stylized images and the background image corresponding to the target style. The composite image is obtained by stitching the multiple stylized images.

In an embodiment of the present disclosure, multiple background images may be pre-stored in the electronic device. The background images may have the same image style, such as the target style, or the background images may have different image styles, which is not limited here.

In an example, after obtaining the stylized images, the electronic device may obtain, from the pre-stored background images, a background image corresponding to the target style and used for generating the composite image.

In an embodiment, the background image corresponding to the target style and used for generating the composite image may be selected randomly from pre-stored background images corresponding to the target style.

In an example, after generating the stylized images, the electronic device may randomly select a background image corresponding to the target style, from the pre-stored background images, as the background image corresponding to the target style and used for generating the composite image.

In another embodiment, the background image corresponding to the target style and used for generating the composite image may be an image which is included in pre-stored background images corresponding to the target style and can accommodate the target quantity of stylized images, where the target quantity may be a total quantity of the original images.

In an example, after generating the stylized images, the electronic device may determine the total quantity of the original images. Then, the electronic device may select, from the pre-stored background images corresponding to the target style, a background image that can accommodate the target quantity of stylized images, as the background image corresponding to the target style and used for generating the composite image.

In another embodiment, the background image corresponding to the target style and used for generating the composite image may be an image which is included in pre-stored background images corresponding to the target style and can accommodate a target quantity of stylized images. The target quantity may be the total quantity of stylized images generated by the electronic device, which is not described in detail here.

In an embodiment of the present disclosure, one background image may belong to one scene type. For example, the scene type may include a gathering scene type, a shopping scene types, a Spring Festival reunion scene type, and the like.

In an embodiment, the background image corresponding to the target style and used for generating the composite image may belong to a scene type selected randomly.

In an example, after generating the stylized images, the electronic device may randomly select, from pre-stored background images corresponding to the target style, a background image belonging to any scene type, as the background image corresponding to the target style and used for generating the composite image.

In another embodiment, the background image corresponding to the target style and used for generating the composite image may belong to a target scene type. The target scene type may be determined based on an image background of an original image.

In an example, after generating the stylized images, the electronic device may identify, in a preset scene identifying algorithm, a scene type corresponding to a background of each original image. Then, the electronic device determines a scene type which corresponds to the most ones of the original images, as the target scene type; and selects, from the pre-stored background images corresponding to the target style, a background image belonging to the target scene type, as the background image corresponding to the target style and used for generating the composite image.

According to the embodiments of the present disclosure, multiple original images are obtained. Each of the original images includes an original object. The style transfer operation is performed on the original object in the original images to obtain multiple stylized images corresponding to the original images in a target style. A composite image obtained by compositing the stylized images and a background image corresponding to the target style is displayed. Then, the original images are beautified and stitched in the target style automatically, without a manual operation from a user, such as an image beautification operation or an image editing operation. In this way, the composite image in the target style is generated automatically by using the original images. Therefore, the time cost for producing the composite image is reduced, the quality of the composite image is improved, and the user experience is improved.

In an embodiment of the present disclosure, the S120 may specifically include: for each of the original images, performing an object recognition on the original image to obtain an original object image corresponding to the original object in the original image; and performing the style transfer operation on the original object image to obtain a stylized image corresponding to the original object image.

In an embodiment, at least one of the original images includes a single original object. In this case, the electronic device may directly apply a pre-trained object recognition model to perform object recognition on the original image, so as to obtain an original object image corresponding to the original object in the original image. Then, the electronic device may apply a pre-trained style transfer model to perform style transfer operation on the original object image, to obtain the stylized image corresponding to the original object image.

In another embodiment, at least one of the original images includes multiple original objects. In this case, the electronic device may apply a pre-trained object recognition model to perform object recognition on each original image to obtain an original object image corresponding to an original object with the largest size in the original image. Then, the electronic device may apply a pre-trained style transfer model to perform style transfer operation on the original object image, to obtain the stylized image corresponding to the original object image.

In another embodiment, at least one of the original images includes multiple original objects. In this case, the electronic device may apply a pre-trained object recognition model to perform object recognition on each original image to obtain original object images corresponding to the original objects in the original image. Then, the electronic device may apply a pre-trained style transfer model to perform style transfer operation on the original object images, to obtain stylized images corresponding to the respective original object images.

Therefore, according to the embodiments of the present disclosure, the stylized images in the target style can be quickly obtained, so that the image beautification has improved entertaining and convenience.

In another embodiment of the present disclosure, in order to improve aesthetic of the stylized images obtained through the style transfer operation, the S120 may specifically include S121 to S122 as below.

In S121, the style transfer operation is performed on the original object image in the original images, to obtain multiple style-transferred images corresponding to the original images in the target style.

In an embodiment, at least one of the original images includes a single original object. In this case, the electronic device may directly apply a pre-trained object recognition model to perform object recognition on each original image, to obtain an original object image corresponding to the original object in the original image and a region matrix of the original object image. Then, the electronic device may apply a pre-trained style transfer model to perform style transfer operation on the original object image, to obtain a style-transferred image corresponding to the original object image, and take the region matrix of the original object image as a region matrix of the style-transferred image.

In another embodiment, at least one of the original images includes multiple original objects. In this case, the electronic device may apply a pre-trained object recognition model to perform object recognition on each original image to obtain an original object with the largest size in the original image, an original object image corresponding to the original object with the largest size, and a region matrix of the original object image. Then, the electronic device may apply a pre-trained style transfer model to perform style transfer operation on the original object image, to obtain a style-transferred image corresponding to the original object image, and take the region matrix of the original object image as a region matrix of the style-transferred image.

In another embodiment, at least one of the original images includes multiple original objects. In this case, the electronic device may apply a pre-trained object recognition model to perform object recognition on each original image to obtain original object images corresponding to respective original objects in the original images and region matrixes of the original object images. Then, the electronic device may apply a pre-trained style transfer model to perform style transfer operation on the original object images, to obtain style-transferred images corresponding to the respective original object images, and take the region matrixes of the original object images as region matrixes of the style transfer images.

In S122, an object modification operation is performed on the style-transferred images to obtain multiple stylized images corresponding to the respective style-transferred images.

After obtaining the style-transferred images and region matrixes of the style-transferred images, the electronic device may perform a background elimination operation on each of the original images, to obtain a subject image corresponding to a subject to which the original object in the original image belongs. Then, the electronic device may perform the following object modification operation on each of the style-transferred images: performing matrix transformation by using a region matrix of the style-transferred image, to fuse the style-transferred image into the subject image to obtain a fused image; performing object modification on the fused image to obtain a modified image; and performing inverse matrix transformation on the modified image by using the region matrix of the style-transferred image to obtain the stylized image.

After obtaining an original object with the largest size in each of the original images, the style-transferred images, and region matrixes of the style-transferred images, the electronic device may perform a background elimination operation on each of the original images to obtain a subject image corresponding to a subject to which the original object with the largest size in the original image belongs. Then, the electronic device may perform the following object modification on each of the style-transferred images: performing matrix transformation by using the region matrix of the style-transferred image, to fuse the style-transferred image into a corresponding subject image to obtain a fused image; performing object modification on the fused image to obtain a modified image; and performing inverse matrix transformation on the modified image by using the region matrix of the style-transferred image to obtain the stylized image.

The object modification may include object magnification and deformation, adding a filter, and other modifications, which are not limited here.

Therefore, according to the embodiments of the present disclosure, the stylized images having the target style and a target modification effect can be obtained quickly, and entertaining of image beautification is improved.

Figure 2:
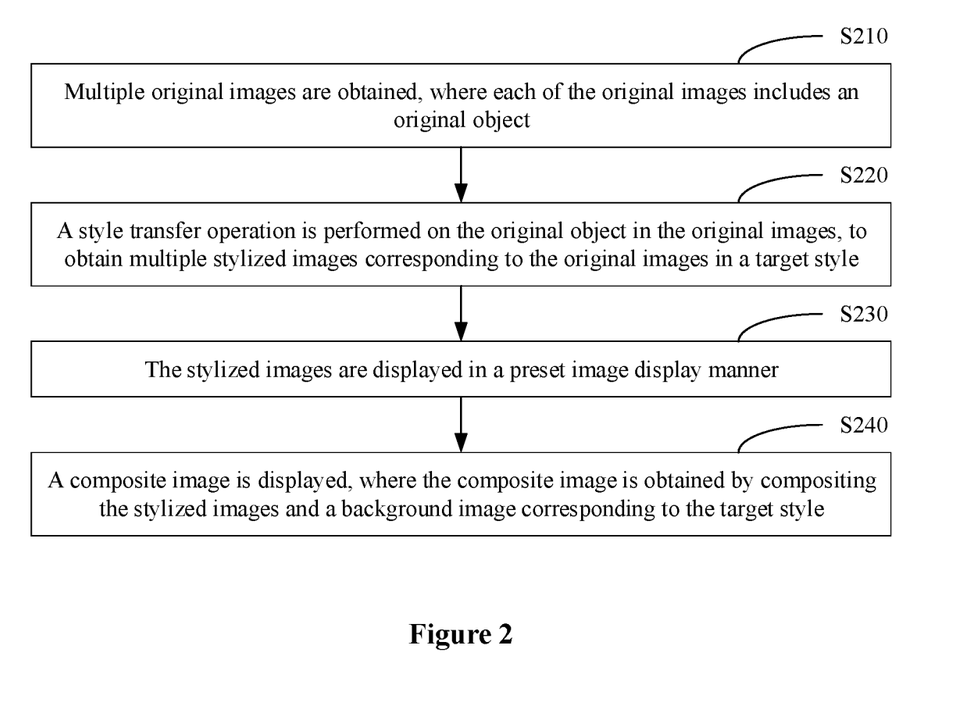
FIG. 2 is a flowchart of a method for displaying an image according to another embodiment of the present disclosure.

In order to enhance entertaining of interaction, a method for displaying an image is further provided according to an embodiment of the present disclosure. Before a composite image is displayed, the method further includes: displaying stylized images in a preset image display manner. The process of displaying the composite may specifically include: switching, in a preset image switching manner, the stylized images to the composite image for display. Reference is made to FIG. 2 to provide illustration below.

In an embodiment of the present disclosure, the method for displaying an image may be executed by an electronic device. The electronic device may include a device having a communication function, such as, a mobile phone, a tablet, a desktop computer, a laptop, an in-vehicle terminal, a wearable electronic device, an all-in-one machine, a smart home device; or may be a device simulated by a virtual machine or simulator.

FIG. 2 shows a flowchart of a method for displaying an image according another embodiment of the present disclosure.

As shown in FIG. 2, the method may include the following steps S210 to S240.

In S210, multiple original images are obtained, where each of the original images includes an original object.

In S220, a style transfer operation is performed on the original object in the original images, to obtain multiple stylized images corresponding to the original images in a target style.

The S210 to S220 are similar to the S110 to S120 in the embodiment as shown in FIG. 1, which will not be described in detail here.

In S230, the stylized images are displayed in a preset image display manner.

In an embodiment of the present disclosure, after obtaining the stylized images, the electronic device may display the stylized images in an image display manner corresponding to a manner of obtaining the original image.

In an embodiment, the manner of obtaining the original images is to capture the original images by the electronic device in real time. In this case, the electronic device may perform, after each original image is captured, a style transfer operation on the captured original image, so as to obtain a stylized image corresponding to the original image. Then, the stylized image corresponding to the original image is display at a designated size on a middle position of a capture preview interface, and the stylized image corresponding to the original image is rotated and moved to a top position of the capture preview interface. The above operation is repeated until all original images are captured. Therefore, stylized images corresponding to all original images can be displayed at the top position of the capture preview interface.

In another embodiment, the manner of obtaining the original image is to capture the original image by the electronic device in real time. In this case, the electronic device may perform a style transfer operation on original objects in original images after all the original images are captured, so as to obtain stylized images corresponding to the respective original images. Then, the stylized images corresponding to the respective original images are displayed in a capture preview interface in a sequence of capturing the original images. Each of the stylized images corresponding to the original images is displayed at a designated size on a middle position of the capture preview interface, and then rotated and moved to a top position of the capture preview interface. The above operation is repeated until all the stylized images corresponding to the original images can be displayed at the top position of the capture preview interface.

In another embodiment, the manner of obtaining the original images is to select the original images on the electronic device locally. In this case, the electronic device may perform a style transfer operation on original objects in original images after all the original images are selected, so as to obtain stylized images corresponding to the respective original images. Then, the stylized images corresponding to the respective original images are displayed in a sequence of selecting the original images. Each of the original images is displayed in full screen, and then the original image disappears through a flash animation manner. Then, the stylized image corresponding to the original image spin-flies in from a designated boundary of an interface, and the stylized image is placed at a designated position. The above operation is repeated until all the stylized images corresponding to the original images are displayed in corresponding designated positions.

In S240, a composite image is displayed, where the composite image is obtained by compositing the stylized images and a background image corresponding to the target style.

In an example, the electronic device may switch, in a preset image switching manner, the stylized images to the composite image for display.

Alternatively, the preset image switching manner may include a preset transition animation.

After displaying the stylized images, the electronic device may switch from an interface displaying the stylized images to an interface displaying the composite image, in the preset transition animation manner. Hence, the composite image is displayed.

The transition animation manner may be preset based on an actual need, and is not limited here. For example, the transition animation manner may include a crayon animation transition manner, a gradient animation transition manner, and the like.

Therefore, according to the embodiments of the present disclosure, the stylized images can be displayed based on the preset image display manner before the composite image is displayed. Therefore, interaction with a user is improved, and entertaining of the interaction is enhanced.

Figure 3:
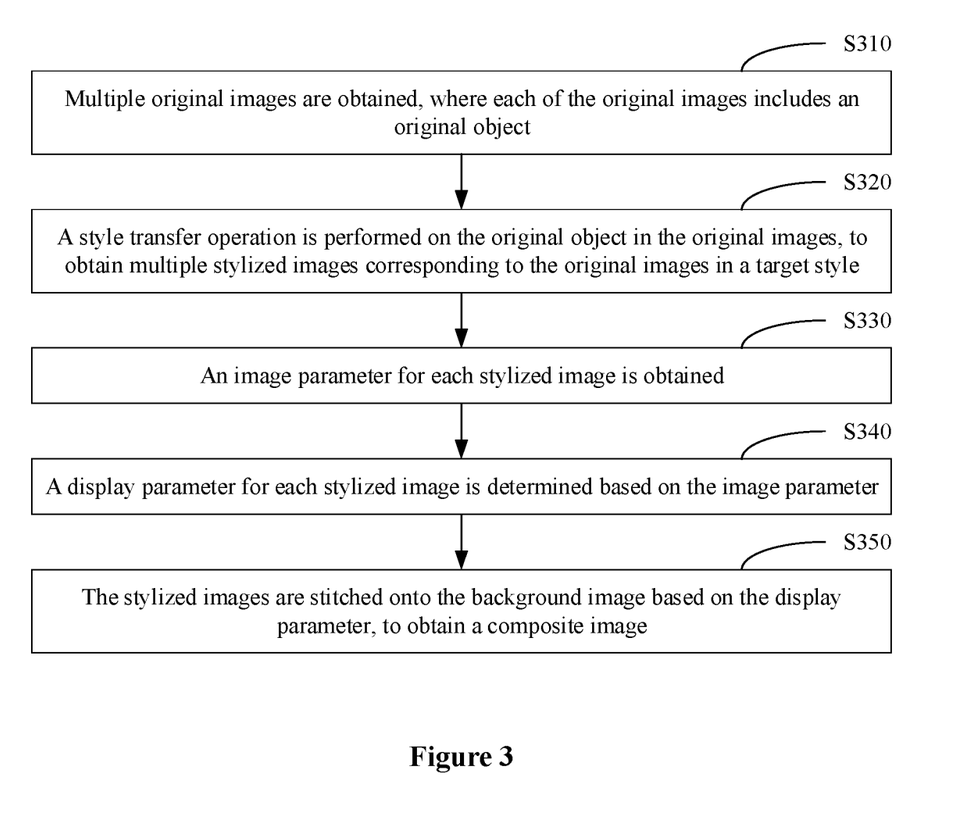
FIG. 3 is a flowchart of a method for displaying an image according to another embodiment of the present disclosure.

In order to enhance the entertaining of composition of images, a method for displaying an image is further provided according to an embodiment of the present disclosure. Before displaying a composite image, the method further includes: obtaining an image parameter of the stylized images; determining a display parameter of the stylized images based on the image parameter; and stitching the stylized images onto the background image based on the display parameter, to obtain the composite image. Reference is made to FIG. 3 to provide illustration below.

In an embodiment of the present disclosure, the method for displaying the image may be executed by an electronic device. The electronic device may include a device having a communication function, such as a mobile phone, a tablet, a desktop computer, a laptop, an in-vehicle terminal, a wearable electronic device, an all-in-one machine, a smart home device; or may be a device simulated by a virtual machine or simulator.

FIG. 3 shows a flowchart of a method for displaying an image according another embodiment of the present disclosure.

As shown in FIG. 3, the method may include the following steps S310 to S360.

In S310, multiple original images are obtained, where each of the original images includes an original object.

In S320, a style transfer operation is performed on the original object in the original images, to obtain multiple stylized images corresponding to the original images in a target style.

The S310 to S320 are similar to the S110 to S120 in the embodiment as shown in FIG. 1, which will not be described in detail herein.

In S330, an image parameter for each stylized image is obtained.

In an embodiment of the present disclosure, the electronic device may obtain the image parameter of each stylized image after obtaining the stylized image corresponding to the original images.

In an embodiment, the image parameter may include any one of the following: a sequence of obtaining the original image corresponding to the stylized image; and an object rotation angle corresponding to the stylized image.

In an embodiment, for each stylized image, the electronic device may determine the original image corresponding to the stylized image, and then determine a sequence of obtaining the original image corresponding to the stylized image as the image parameter of the stylized image.

In another embodiment, the electronic device may detect a rotation angle of an object on each stylized image based on a preset object posture detecting algorithm, so as to obtain the object rotation angle corresponding to the stylized image.

The object rotation angle may include at least one of: an object yaw angle, an object pitch angle, and an object roll angle.

In an example where the original object includes a head, the object rotation angle of the stylized image may include at least one of: a yaw angle of the head, a pitch angle of the head, and a roll angle of the head.

In S340, a display parameter for each stylized image is determined based on the image parameter.

In an embodiment of the present disclosure, for each stylized image, after obtaining the image parameter of the stylized image, the electronic device may determine the display parameter for the stylized image in the background image, based on the image parameter of the stylized image.

In an example, the electronic device may first obtain a background image for generating the composite image, and obtain multiple groups of preset display parameters corresponding to the background image. One group of the preset display parameter is for placing one stylized image on the background image. The electronic device may select, based on the image parameter of each stylized image, the display parameter for the stylized image in the background image from the multiple groups of preset display parameters corresponding to the background image.

In the case that the image parameter is the sequence of obtaining the original images corresponding to the stylized images, one group of the preset display parameter may correspond to one sequence. Therefore, the electronic device may select, directly from the multiple groups of preset display parameters corresponding to the background image, a group of the preset display parameter corresponding to the sequencer of obtaining the original images corresponding to the stylized images, as the display parameter for the stylized images in the preset stylized background image.

In the case that the image parameter is the object rotation angle corresponding to the stylized image, one group of the preset display parameter may correspond to one rotation angle range. Therefore, the electronic device may select, directly from the multiple groups of preset display parameters corresponding to the background image, a group of the preset display parameter corresponding to the rotation angle range covering the object rotation angle corresponding to the stylized image, as the display parameter for the stylized image in the background image.

For example a stylized image includes a head image in the target style, and the object rotation angle of the stylized image includes a yaw angle of the head. One group of the preset display parameter may correspond to a yaw angle range. Therefore, the electronic device may select, directly from the multiple groups of preset display parameters corresponding to the background image, a group of the preset display parameter corresponding to the yaw angle range covering the yaw angle of the head corresponding to the head image in the target style, as the display parameter for the stylized image in the background image.

In an embodiment of the present disclosure, the display parameter may include at least one of the following: a display size, a display position, and a display angle.

The display size may refer to a display size of a stylized image in the background image. The display size is for determining a scaling ratio of the stylized image.

The display position may refer to a display position of a stylized image in the background image. The display position is for determining a position of the stylized image in the background image.

The display angle may refer to a display angle of a stylized image in the background image. The display angel is for determining a rotation angle of the stylized image.

In S350, the stylized images are stitched onto the background image based on the display parameter, to obtain a composite image.

In an embodiment of the present disclosure, the electronic device may adjust the display parameter of each stylized image from an initial display parameter to the display parameter in the background image; and then stitch the stylized images having the adjusted display parameter onto the background image, to obtain the composite image.

In an example, for each of the stylized images, the electronic device may determine, a size scaling ratio of the stylized image based on an initial display size of the stylized image and a display size of the stylized image in the background image; adjust a size of the stylized image based on the determined size scaling ratio; determine a rotation angle of the stylized image based on an initial display angle of the stylized image and a display angle of the stylized image in the background image; adjust an angle of the stylized image based on the determined rotation angle. Then, the electronic device may stitch the stylized images onto the background image based on the display position of the stylized images in the background image, to obtain the composite image.

In S360, a composite image is displayed, where the composite image is obtained by compositing the stylized images and the background image corresponding to the target style.

Therefore, according to the embodiments of the present disclosure, the electronic device can automatically determine, for the stylized images corresponding to the original objects, the display parameters in the background image; and perform composition on the stylized images in the background image based on the display parameter, to obtain the composite image. Hence, entertaining of the composition is enhanced.

For ease of understanding, an image processing process in an embodiment of the present disclosure is described in detail below with reference to FIG. 4 and FIG. 5.

Figure 4:
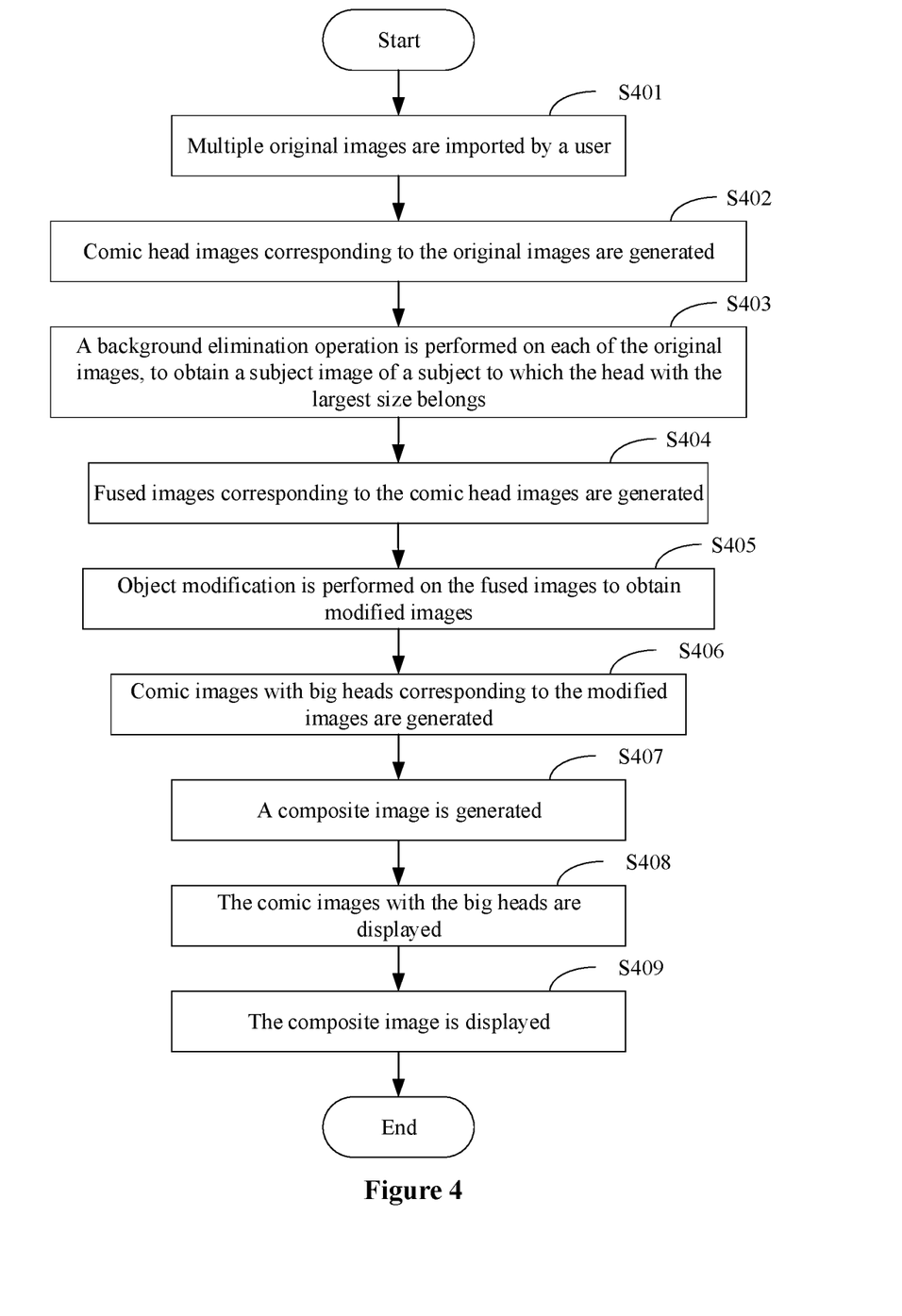
FIG. 4 is a flowchart of an image processing process according to an embodiment of the present disclosure.

FIG. 4 shows a flowchart of an image processing process according to an embodiment of the present disclosure.

As shown in FIG. 4, an image processing process may specifically include the following steps S401 to S409.

In S401, multiple original images are imported by a user.

In an example, the user may control an electronic device to enter an image selection mode, and select multiple original images from local images displayed in the electronic device while the electronic device is in the image selection mode.

In S402, comic head images corresponding to the original images are generated.

In an example, the electronic device may input the original images into a pre-trained transfer-to-comic model, to obtain comic head images and region matrixes of the comic head images. Each of the comic head images corresponds to a head with the largest size in one of the original images Each comic head image may include at least one of an image of a comic human head and an image of a comic animal head.

In S403, a background elimination operation is performed on each of the original images, to obtain a subject image of a subject to which the head with the largest size belongs.

In an example, the electronic device may perform the background elimination on each of the original images with respect to the subject to which the head with the largest size belongs. In this way, the subject images corresponding to the original images are obtained.

The subject may include at least one of a human or an animal.

In S404, fused images corresponding to the comic head images are generated.

In an example, the electronic device may perform a matrix transformation by using the region matrixes of the comic head images, to fuse the comic head images into the subject images correspondingly, so as to obtain the fused images corresponding to the comic head images.

In S405, object modification is performed on the fused images to obtain modified images.

In an example, the electronic device may modify the fused images by magnifying and deforming the head and adding a filter, and the like, to obtain the modified images.

In S406, comic images with big heads corresponding to the modified images are generated.

In an example, the electronic device may perform an inverse matrix transformation on the modified images by using the region matrixes of the comic head images, respectively, to obtain, for the modified images, canvases including the comic images with big heads. The electronic device may crop the canvases based on the region matrixes to obtain the comic images with the big heads.

In S407, a composite image is generated.

In an example, the electronic device may select a comic background image of a Spring Festival reunion scene type, and stitch the comic images with the big heads onto the comic background image to obtain the composite image.

In S408, the comic images with the big heads are displayed.

In an example, the electronic device may display the comic images with the big heads corresponding to the original images in a sequence of selecting the original images. Each original image is displayed in full screen, and then is eliminated through a flashing animation. Then, a comic image with a big head corresponding to the original image spin-flies in from a bottom boundary of the flashing animation, and the flied comic image with the big head is placed at a designated position. The above operations are repeated until all the comic images with the big heads corresponding to the original images are displayed at corresponding designated positions.

In S409, the composite image is displayed.

In an example, the electronic device may switch, through a crayon animation transition manner, from display of the comic images with the big heads to display of the composite image.

Therefore, according to the embodiment of the present disclosure, a user can upload multiple original images and perform beautification and stitching on the original images to generate the comic photo having the Spring Festival reunion effect.

Figure 5:
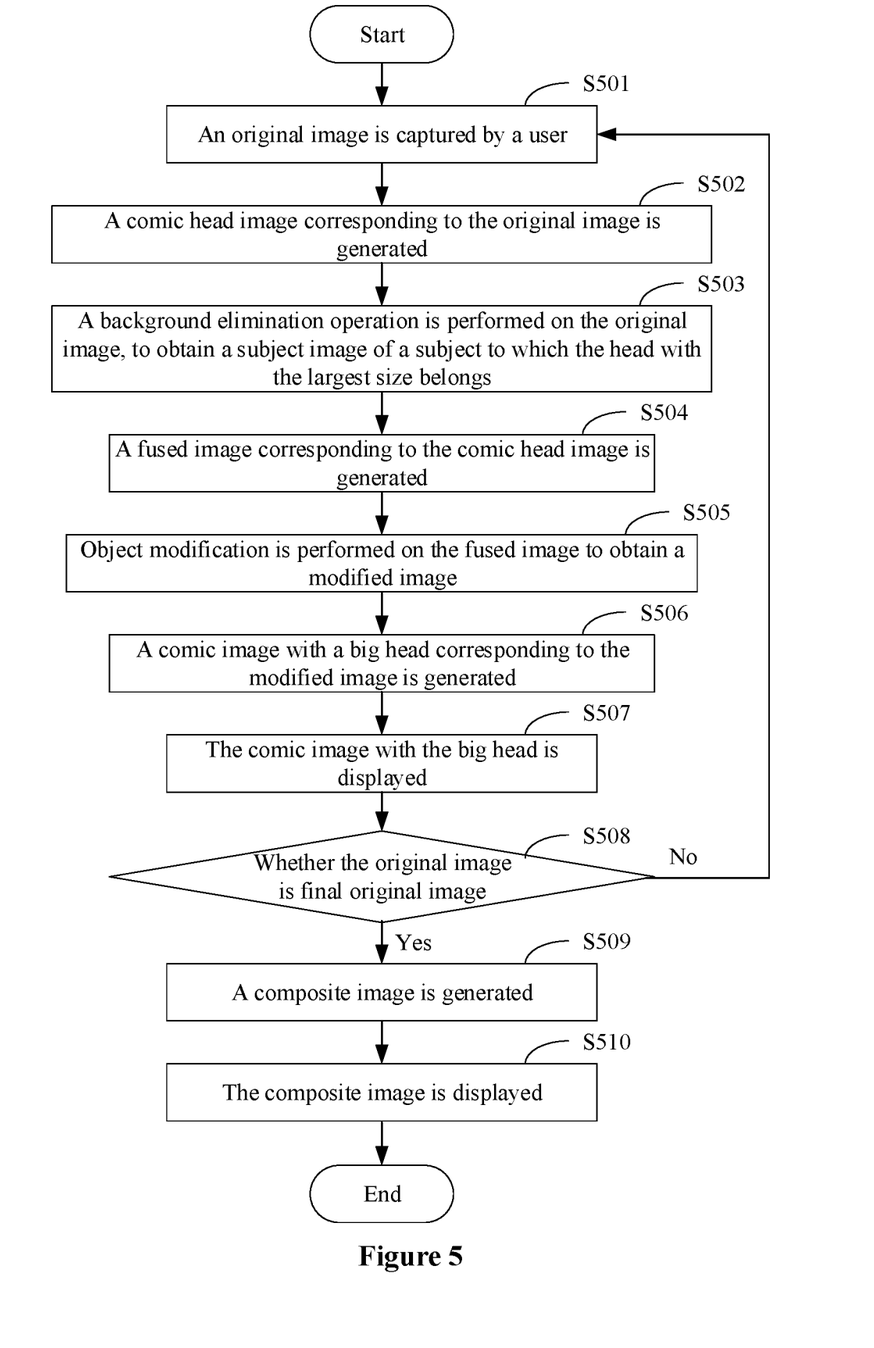
FIG. 5 is a flowchart of an image processing process according to another embodiment of the present disclosure.

FIG. 5 is a flowchart of an image processing process according to another embodiment of the present disclosure.

As shown in FIG. 5, the image processing process may specifically include the following steps S501 to S510.

In S501, an original image is captured by a user.

The user may control an electronic device to enter an image capture mode, and capture the original image in a capturing manner specified in the image capture mode while the electronic device is in the image capture mode.

In S502, a comic head image corresponding to the original image is generated.

In an example, the electronic device may input the original image into a pre-trained transfer-to-comic model, to obtain a comic head image corresponding to a head with a largest size in the original image and a region matrix of the comic head image.

The comic head image may include at least one of an image of a comic human head and an image of a comic animal head.

In S503, a background elimination operation is performed on the original image, to obtain a subject image of a subject to which the head with the largest size belongs.

In an example, the electronic device may perform the background elimination operation on the subject to which the head with the largest size belongs in the original image, so as to obtain the subject image corresponding to the original image.

The subject may include at least one of a human or an animal.

In S504, a fused image corresponding to the comic head image is generated.

In an example, the electronic device may perform a matrix transformation by using the region matrix of the comic head image, to fuse the comic head image into the subject image, so as to obtain the fused image corresponding to the comic head image.

In S505, object modification is performed on the fused image to obtain a modified image.

In an example, the electronic device may modify the fused image by magnifying and deforming the head and adding a filter, and the like, to obtain the modified image.

In S506, a comic image with a big head corresponding to the modified image is generated.

In an example, the electronic device may perform an inverse matrix transformation on the modified image by using the region matrix of the comic head image, to obtain, for the modified image, a canvas including the comic image with the big head. The electronic device may crop the canvas based on the region matrix to obtain the comic image with the big head.

In S507, the comic image with the big head is displayed.

In an example, the electronic device may display the comic image with the big head at a designated size on a middle position of a capture preview interface, and rotate and move the comic image with the big head to a top position of the capture preview interface.

In S508, it is determined whether the original image is a final original image. The process proceeds to S509 in the case that the original image is the final original image. The process proceeds to S501 in the case that the original image is not the final original image.

In an example, the electronic device may determine whether the quantity of captured original images reaches a designated quantity. The electronic device determines that the original image is the final original image if the quantity of captured original images reaches the designated quantity, and determines that the original image is not the final original image if the quantity of captured original images does not reach the designated quantity.

In another example, the electronic device may determine whether an instruction for finishing capturing is received from the user. The electronic device determines that the original image is the final original image if the instruction is received, and determines that the original image is not the final original image if the instruction is not received.

In S509, a composite image is generated.

In an example, the electronic device may select a comic background image of a Spring Festival reunion scene type, and stitch all comic images with the big heads onto the comic background image to obtain the composite image.

In S510, the composite image is displayed.

In an example, the electronic device may switch, through a crayon animation transition manner, from display of the comic image with the big head to display of the composite image.

Therefore, according to the embodiment of the present disclosure, a user can capture multiple original images and perform beautification and stitching on the original images to generate the comic photo having the Spring Festival reunion effect.

It should be noted that the comic image with the big head is merely an example.

An apparatus for displaying an image is further provided in an embodiment of the present disclosure, which is capable of performing the method for displaying the image. The apparatus is illustrated below with reference to FIG. 6.

In an embodiment of the present disclosure, the apparatus for displaying the image may be an electronic device. The electronic device may include a device having a communication function, such as, a mobile phone, a tablet, a desktop computer, a laptop, an in-vehicle terminal, a wearable electronic device, an all-in-one machine, a smart home device; or may be a device simulated by a virtual machine or simulators.

Figure 6:
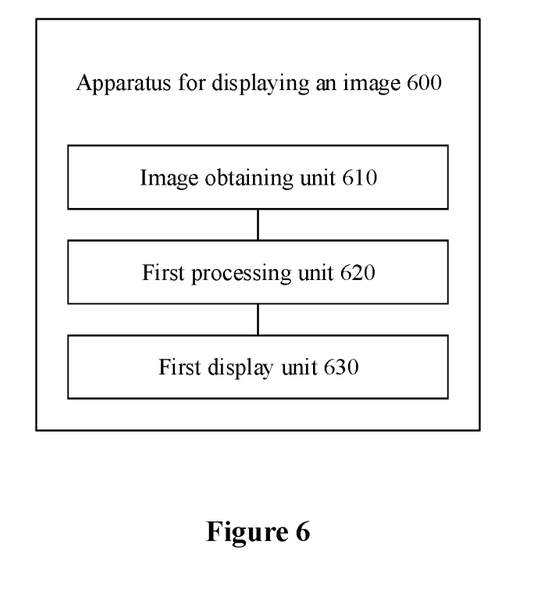
FIG. 6 is a schematic structural diagram of an apparatus for displaying an image according to an embodiment of the present disclosure.

FIG. 6 is a schematic structural diagram of an apparatus for displaying an image according to an embodiment of the present disclosure.

As shown in FIG. 6, the apparatus 600 may include an image obtaining unit 610, a first processing unit 620, and a first display unit 630.

The image obtaining unit 610 may be configured to obtain multiple original images, where each of the original images includes an original object.

The first processing unit 620 may be configured to perform a style transfer operation on the original object in the original images, to obtain multiple stylized images corresponding to the original images in a target style.

The first display unit 630 may be configured to display a composite image obtained by compositing the stylized images and a background image corresponding to the target style.

In an embodiment of the present disclosure, multiple original images are obtained. Each of the original images includes an original object. The style transfer operation is performed on the original object in the original images to obtain multiple stylized images corresponding to the original images in the target style. The composite image obtained by compositing the stylized images and the background image corresponding to the target style is displayed. Then, the original images are beautified and stitched in the target style automatically, without a manual operation from a user, such as an image beautification operation or an image editing operation. In this way, the composite image in the target style is generated automatically by using the original images. Therefore, the time cost for producing the composite image is reduced, the quality of the composite image is improved, and the user experience is improved.

In an embodiment of the present disclosure, the apparatus 600 may further include a second display unit configured to display the stylized images in a preset image display manner.

The first display unit 630 may be further configured to switch the stylized images to the composite image for display, in a preset image switching manner.

In an embodiment of the present disclosure, the first processing unit 620 may include a first processing sub-unit and a second processing sub-unit.

The first processing sub-unit may be configured to perform the style transfer operation on the original object in the original images, to obtain multiple style-transferred images corresponding to the original images in the target style.

The second processing sub-unit may be configured to perform an object modification operation on the style-transferred images, to obtain the stylized images corresponding to the style-transfer images.

In an embodiment of the present disclosure, each of the original images may include multiple original objects.

The first processing unit 620 may be further configured to perform, for each of the original images, the style transfer operation on an original object with the largest size in the original image, to obtain the stylized images.

In an embodiment of the present disclosure, the apparatus 600 may further include a parameter obtaining unit, a second processing unit, and an image composition unit.

The parameter obtaining unit may be configured to obtain an image parameter of each of the stylized images.

The second processing unit may be configured to determine a display parameter for each of the stylized images based on the image parameter.

The image composition unit may be configured to stitch the stylized images onto the background image based on the display parameters, to obtain the composite image.

In an embodiment of the present disclosure, the image parameter may include any one of the following: a sequence of obtaining the original image corresponding to the stylized image; and an object rotation angle corresponding to the stylized image.

In an embodiment of the present disclosure, the display parameter may include at least one of: a display size, a display position, and a display angle.

In an embodiment of the present disclosure, the background image is used for placing the target quantity of stylized images, and the target quantity is equal the total quantity of the original images.

In an embodiment of the present disclosure, the background image may be of a target scene type, and the target scene type is determined based on a background of the original images.

It should be noted that the image display device 600 as shown in FIG. 6 can performs the steps in the method embodiments as shown in FIG. 1 to FIG. 5, and implement the processes and effects in the method embodiments as shown in FIGS. 1 to 5, which are not described in further detail here.

A device for displaying an image is further provided in an embodiment of the present disclosure. The device may include a processor and a memory. The memory stores executable instructions. The processor may be configured to read executable instructions from the memory and execute the executable instructions to implement the method for displaying the image as in the above embodiments.

Figure 7:
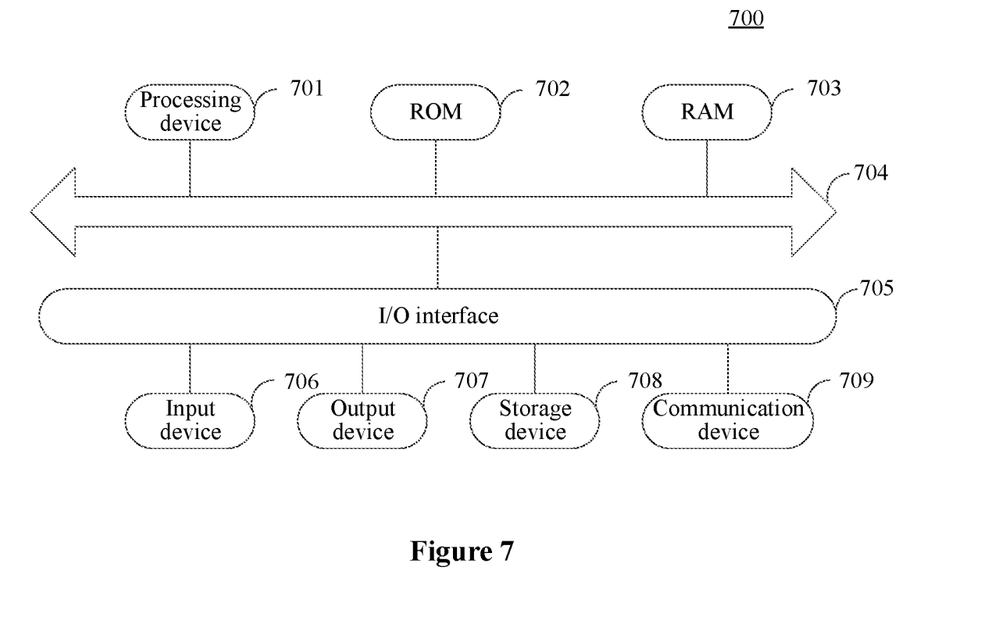
FIG. 7 is a schematic structural diagram of a device for displaying an image according to an embodiment of the present disclosure.

FIG. 7 is a schematic structural diagram of a device for displaying an image according to an embodiment of the disclosure. Reference is made to FIG. 7, which shows a schematic structural diagram of a device 700 for displaying an image suitable for implementing the embodiments of the present disclosure.

The device 700 for displaying an image in an embodiment of the present disclosure may be an electronic device. The electronic device may include, but is not limited to, a mobile terminal, such as a mobile phone, a notebook computer, a digital broadcast receiver, a PDA (Personal Digital Assistant), a PAD (Tablet computer), a PMP (Portable Multimedia Player), an in-vehicle terminal (such as an in-vehicle navigation terminal), and a wearable device, and a fixed terminal such as a digital TV, a desktop computer, and a smart home device.

It should be noted that the device 700 shown in FIG. 7 is only an example, and should not impose any limitation on the functions and applications of the embodiments of the present disclosure.

As shown in FIG. 7, the device 700 may include a processing device (such as a central processing unit, and a graphics processor) 701 that may execute various appropriate actions and processes according to a program stored in a read only memory (ROM) 702 or loaded into a random access memory (RAM) 703 from a storage device 708. The RAM 703 further stores various programs and data necessary for the operation of the device 700. The processing device 701, the ROM 702, and the RAM 703 are connected to each other through a bus 704. An input/output (I/O) interface 705 is also connected to the bus 704.

Generally, the following devices may be connected to the I/O interface 705: an input device 706 such as a touch screen, a touchpad, a keyboard, a mouse, a camera, a microphone, an accelerometer, and a gyroscope; an output device 707, such as a liquid crystal display (LCD), a speaker, and a vibrator; a storage device 708, such as a magnetic tape and a hard disk; and a communication device 709. The communication device 709 may enable the device 700 to communicate in a wireless or wired manner with other devices to exchange data. Although FIG. 7 shows the device 700 having various apparatuses, it should be understood that not all of the illustrated apparatuses are required to be implemented or provided. More or fewer devices may alternatively be implemented or provided.

A computer-readable storage medium is further provided in an embodiment of the present disclosure. The computer-readable storage medium stores a computer program. The computer program, when executed by a processor, implements the method for displaying the image as in the above embodiments.

In particular, according to embodiments of the present disclosure, the processes described above with reference to the flowcharts may be implemented as computer software programs.

A computer program produce is further provided in an embodiment of the present disclosure. The computer program produce may include a computer program. The computer program, when executed by a processor, causes the process to implement the method for displaying the image as in the above embodiments.

For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 709, or from the storage device 708, or from the ROM 702. When the computer program is executed by the processing device 701, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium may be any computer-readable medium other than a computer-readable storage medium that can transmit, propagate, or transport the program for use by or in connection with the instruction execution system, apparatus or device. Program code stored on a computer readable medium may be transmitted using any suitable medium, including, but not limited to, an electrical wire, an optical fiber cable, RF (radio frequency), or any suitable combination thereof.

In some embodiments, the client and server may perform communication by using any currently known network protocol, such as HTTP (HyperText Transfer Protocol), or future network protocol, and may be connected with digital data network in any form or medium (such as a communication network). Examples of communication networks include a local area network (LAN), a wide area network (WAN), an internet (e.g., the Internet), a peer-to-peer network (such as the ad hoc peer-to-peer network), and any current or future network.

The above-mentioned computer-readable medium may be included in the above-mentioned device, or may exist alone without being assembled into the device.

The above-mentioned computer-readable medium carries one or more programs. The one or more programs, when executed by the device for displaying an image, configure the device to: obtain multiple original images, where each of the original images includes an original object; perform a style transfer operation on the original object in the original images, to obtain multiple stylized images corresponding to the original images in a target style; and display a composite image obtained by compositing the stylized images and a background image corresponding to the target style.

In an embodiment of the present disclosure, computer program code for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to a user computer through any kind of network, including a local area network (LAN) or a wide area network (WAN), or may be connected to an external computer (e.g., using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in a reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances.

The functions described above may be performed, at least in part, by one or more hardware logic components. For example, without limitation, examples of hardware logic components that may be used include: a Field Programmable Gate Array (FPGA), an Application Specific Integrated Circuit (ASIC), an Application Specific Standard Product (ASSP), a System on Chip (SOC), a Complex Programmable Logical Device (CPLD), and the like.

In the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination thereof. More specific examples of the machine-readable storage medium include an electrical connection based on one or more wires, a portable computer disk, a hard disk, a random access memory (RAM), a read only memory (ROM), an erasable programmable read only memory (EPROM or flash memory), a fiber optic, a compact disk read only memory (CD-ROM), an optical storage device, a magnetic storage device, or any suitable combination thereof.

Hereinabove describes merely preferred embodiments of the present disclosure and illustration of applied technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in the present disclosure (which is not limiting).

In addition, although operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in a language specific to structural features and/or logical actions, it should be understood that the subject matter defined in the appended claims are unnecessarily limited to the specific features or actions described above. The specific features and actions described above are merely exemplary forms of implementing the claims.

The invention claimed is:

1. A method for displaying an image, comprising:
obtaining a plurality of original images, wherein each of the plurality of original images comprises an original object;
performing a style transfer operation on the original object in the plurality of original images by using a pre-trained style transfer model, to obtain a plurality of stylized images corresponding to the plurality of original images in a target style;
determining a total quantity of stylized images;
selecting, from pre-stored background images, a background image which corresponds to the target style and is configured to accommodate the total quantity of obtained stylized images, as a to-be-composited background image; and
displaying, on a user interface of an electrical device, a composite image obtained by compositing the plurality of stylized images and the to-be-composited background image.

2. The method according to claim 1, wherein before displaying the composite image, the method further comprises
displaying the stylized images in a preset image display manner; and the displaying a composite image comprises:
switching the plurality of stylized images to the composite image for display, in a preset image switching manner.

3. The method according to claim 1, wherein the performing a style transfer operation on the original object in the original images, to obtain a plurality of stylized images corresponding to the plurality of original images in a target style, comprises:
performing the style transfer operation on the original object in the original images, to obtain a plurality of style-transferred images corresponding to the original images in the target style; and
performing an object modification operation on the plurality of style-transferred images to obtain the plurality of stylized images corresponding to the plurality of style-transferred images.

4. The method according to claim 1, wherein each of the original images comprises a plurality of original objects; and
the performing a style transfer operation on the original object in the plurality of original images, to obtain a plurality of stylized images corresponding to the plurality of original images in a target style comprises:
performing, for each of the plurality of original images, the style transfer operation on an original object with the largest size in the original image, to obtain the stylized image.

5. The method according to claim 1, wherein before the displaying the composite image, the method further comprises:
obtaining an image parameter of each of the plurality of stylized images; and
determining a display parameter for the stylized image based on the image parameter,
wherein the composite image is obtained by stitching the plurality of stylized images onto the background image based on the display parameters.

6. The method according to claim 5, wherein the image parameter for each of the plurality of stylized images comprises any one of:
a sequence of obtaining the original image corresponding to the stylized image; and
an object rotation angle corresponding to the stylized image.

7. The method according to claim 5, wherein the display parameter comprises at least one of the following: a display size, a display position, and a display angle.

8. The method according to claim 1, wherein the background image is of a target scene type, and
the target scene type is determined based on a background of the original images.

9. A device for displaying an image, comprising:
a processor; and
a memory storing executable instructions; wherein
the processor is configured to read the executable instructions from the memory, and execute the executable instructions to:
obtain a plurality of original images, wherein each of the plurality of original images comprises an original object;
perform a style transfer operation on the original object in the plurality of original images by using a pre-trained style transfer model, to obtain a plurality of stylized images corresponding to the plurality of original images in a target style;

determine a total quantity of stylized images;
select, from pre-stored background images, a background image which corresponds to the target style and is configured to accommodate the total quantity of obtained stylized images, as a to-be-composited background image; and
display, on a user interface of an electrical device, a composite image obtained by compositing the plurality of stylized images and the to-be-composited background image.

10. The device according to claim 9, wherein the processor is configured to read the executable instructions from the memory, and execute the executable instructions to:
display the stylized images in a preset image display manner; and
switch the plurality of stylized images to the composite image for display, in a preset image switching manner.

11. The device according to claim 9, wherein the processor is configured to read the executable instructions from the memory, and execute the executable instructions to:
perform the style transfer operation on the original object in the original images, to obtain a plurality of style-transferred images corresponding to the original images in the target style; and
perform an object modification operation on the plurality of style-transferred images to obtain the plurality of stylized images corresponding to the plurality of style-transferred images.

12. The device according to claim 9, wherein each of the original images comprises a plurality of original objects; and
the processor is configured to read the executable instructions from the memory, and execute the executable instructions to:
perform, for each of the plurality of original images, the style transfer operation on an original object with the largest size in the original image, to obtain the stylized image.

13. The device according to claim 9, wherein before the composite image is displayed, the processor is configured to read the executable instructions from the memory, and execute the executable instructions to:
obtain an image parameter of each of the plurality of stylized images; and
determine a display parameter for the stylized image based on the image parameter,
wherein the composite image is obtained by stitching the plurality of stylized images onto the background image based on the display parameters.

14. The device according to claim 13, wherein the image parameter for each of the plurality of stylized images comprises any one of:
a sequence of obtaining the original image corresponding to the stylized image; and
an object rotation angle corresponding to the stylized image.

15. The device according to claim 13, wherein the display parameter comprises at least one of the following: a display size, a display position, and a display angle.

16. The device according to claim 9, wherein the background image is of a target scene type, and
the target scene type is determined based on a background of the original images.

17. A non-transitory computer-readable storage medium, storing a computer program, wherein
the computer program, when executed by a processor, causes the processor to:

obtain a plurality of original images, wherein each of the plurality of original images comprises an original object;

perform a style transfer operation on the original object in the plurality of original images by using a pre-trained style transfer model, to obtain a plurality of stylized images corresponding to the plurality of original images in a target style;

determine a total quantity of stylized images;

select, from pre-stored background images, a background image which corresponds to the target style and is configured to accommodate the total quantity of obtained stylized images, as a to-be-composited background image; and display, on a user interface of an electrical device, a composite image obtained by compositing the plurality of stylized images and the to-be-composited background image.

18. The non-transitory computer-readable storage medium according to claim 17, wherein the computer program, when executed by a processor, causes the processor to:

display the stylized images in a preset image display manner; and switch the plurality of stylized images to the composite image for display, in a preset image switching manner.

* * * * *